United States Patent
Smith

(10) Patent No.: US 6,535,233 B1
(45) Date of Patent: Mar. 18, 2003

(54) METHOD AND APPARATUS FOR ADJUSTING THE DISPLAY SCALE OF AN IMAGE

(75) Inventor: Andrew John Smith, Warwick (GB)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/444,983

(22) Filed: Nov. 22, 1999

(30) Foreign Application Priority Data

Nov. 20, 1998 (GB) .............................................. 9825326

(51) Int. Cl.[7] .............................. G06F 3/02; G06F 3/14; G06T 3/40
(52) U.S. Cl. ........................ 345/856; 345/764; 345/667; 345/661
(58) Field of Search ................................. 345/856, 764, 345/859, 861, 964, 428, 660, 661, 665, 667, 668, 860, 863, 160, 157, 159, 168; 707/502

(56) References Cited

U.S. PATENT DOCUMENTS

| | | | | |
|---|---|---|---|---|
| 5,032,989 A | * | 7/1991 | Tornetta | ................. 345/667 X |
| 5,187,776 A | * | 2/1993 | Yanker | ................... 345/856 X |
| 5,341,466 A | * | 8/1994 | Perlin et al. | ................. 345/668 |
| 5,638,523 A | * | 6/1997 | Mullet et al. | ........... 345/661 X |
| 5,880,709 A | * | 3/1999 | Itai et al. | ................ 345/660 X |
| 6,054,990 A | * | 4/2000 | Tran | ........................... 345/863 |

* cited by examiner

Primary Examiner—Raymond J. Bayerl
(74) Attorney, Agent, or Firm—Ronald L. Drumheller

(57) ABSTRACT

In a graphical application which allows an image to be displayed according to a display scale, a method of adjusting the display scale during modification of the image. The method responds to user selection of a modification to be performed on the image by storing the current display scale. Then the current display scale is automatically adjusted during modification of the image and in response to user completion of the modification the stored display scale is automatically returned. In a preferred embodiment, the velocity of a pointing device is measured and the display scale is adjusted as a function of the velocity of the pointing device during graphical modification and before the display of the image is re-centered on the pointing device position.

15 Claims, 2 Drawing Sheets

METHOD AND APPARATUS FOR ADJUSTING THE DISPLAY SCALE OF AN IMAGE

FIELD OF THE INVENTION

The present invention relates to a method and apparatus for adjusting the display scale of an image.

BACKGROUND OF THE INVENTION

Graphical applications, for example, drawing applications like Photoshop or Illustrator from Adobe, Publisher from Microsoft, AutoCad or even presentation applications such as Freelance from Lotus which include drawing features, regardless of whether they are vector or raster image based, commonly provide a zoom function. This enables an increase or decrease in the displayed scale of the image being worked on and allows either precise modification of an image with a pointing device or a keyboard or an overview of large portions of the image.

The setting of the displayed scale is typically performed as a discrete operation to the modification of the image, requiring the user to break from actual modification, set the required display scale, perform the modification, and then return the display scale to its original value.

This can be particularly annoying for a user who wishes to, for example, draw a line between remote points in a relatively large or complex drawing. If the user wishes to see both the start and end points of the line at the same time, the scale may have to be increased before drawing the line to the point where the user may not be able to accurately place the start and end points. Alternatively, the user zooms in before placing the start point and then pans across the drawing using one or both of the horizontal or vertical slider bars usually provided in such graphical applications. This can be disorienting for the user who may not appreciate their location within the drawing,

DISCLOSURE OF THE INVENTION

Accordingly, the present invention provides a method and apparatus for automatically adjusting the display scale of an image during modification of the image.

BRIEF DESCRIPTION OF THE DRAWINGS

Embodiments of the invention will now be described with reference to the accompanying drawings, in which.

DESCRIPTION OF THE PREFERRED EMBODIMENTS

Figure 1:
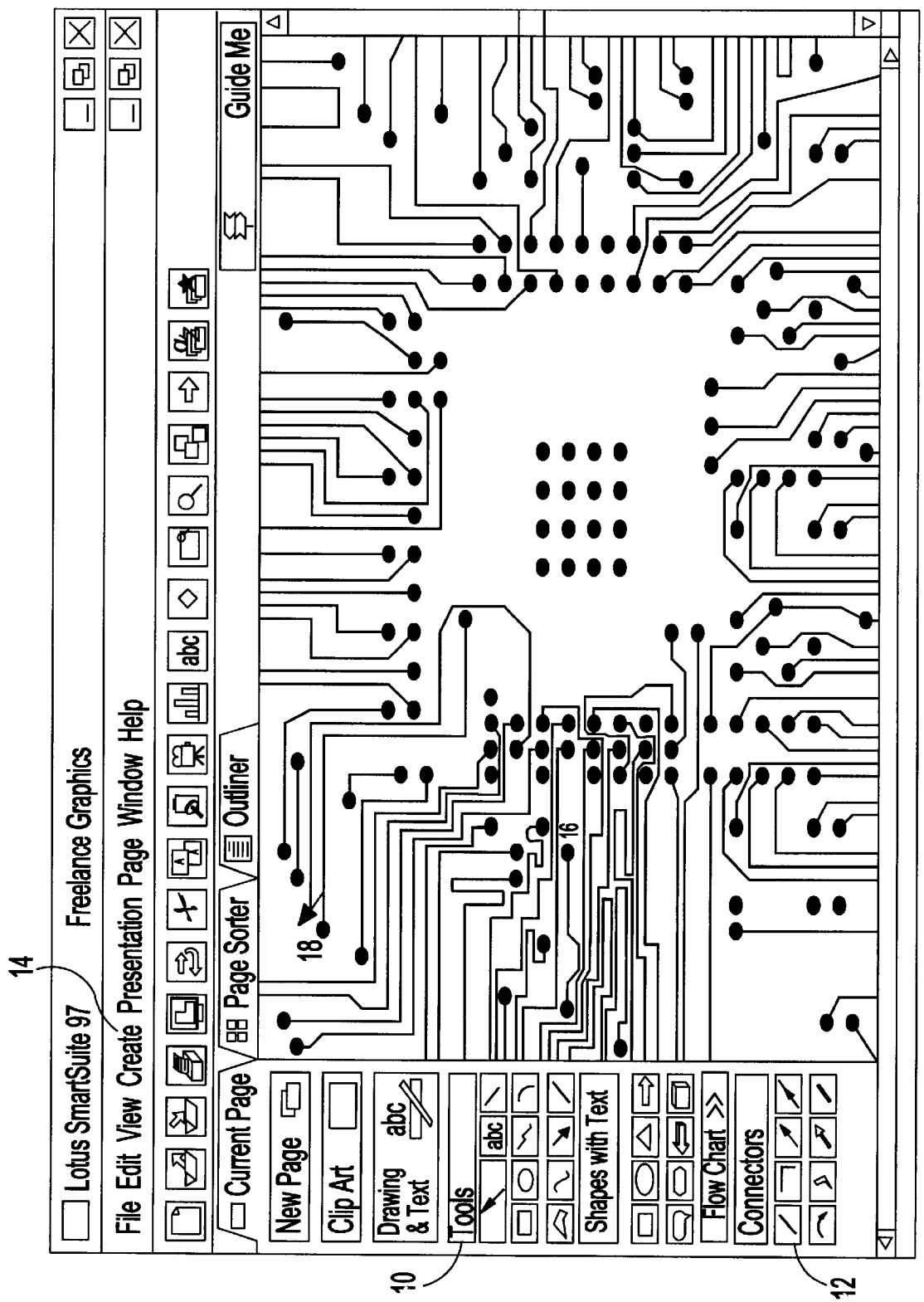
FIG. 1 shows a graphical application in which a circuit diagram image is displayed with a small display scale.

The present invention is described in terms of a graphical application operating within a graphical operating system, for example, Windows '95 from Microsoft Corporation. Graphical operating systems typically signal events describing user input. In the context of the present invention, the events of interest to the portion of the graphical application controlling display scale are mouse button press and release, mouse movement, key press, and time expiry. Mouse events are assumed to carry mouse pointer position information with them.

Modification of an image within a graphical application generally falls into two broad categories:

Transformations of graphical entities including: translation, where entities are moved from one position to another; rotation, where entities are rotated about a defined point; scaling, where entities are scaled from a defined scaling origin; and inversion, where entities are flipped about a defined axis. The invention applies particularly to translation where a user may wish to view different portions of an image at different scales during the transformation, but may also have application with other transformations.

Addition of graphical entities including: lines; polylines; shapes such as rectangles, circles or symbols; text boxes; or graphics such as clip art or library objects.

In the case of transformations where graphical entities are already created, graphical drawing applications typically allow a graphical entity, or group of graphical entities, to be selected and operated on. Operations with a pointing device may operate using a selection, where for example a mouse pointer is located over an entity, the user left-clicks to select and highlight the entity and then moves the pointer to a pull-down menu of transformations. Drawing applications, however, do not always need prior selection since operations with a pointing device implicitly identify the graphical entity to be operated on. For example, a mouse pointer may be located over the entity, then the user right-clicks to select the transformation to be performed on the entity from a pop-up menu; or in the case of translation, the use simply clicks and drags the object to a desired location.

Transformations using a pointing device such as a mouse are typically initiated by the depression of a mouse button while the mouse is position over the graphical entity to be transformed. Transformations are typically completed by the release of the same mouse button that initiated the transformation.

In a preferred embodiment, a drawing application is responsive to mouse pointer movements where:

a. On receipt of a mouse button press event, a flag is set indicating a transformation mode, the current display scale and display position stored as d0, the mouse position stored as p1, and the time stored as t1. An asynchronous timer is started and set to generate time expiry events at suitable intervals.

b. On receipt of mouse movement events whilst in the transformation mode, the mouse position is stored as p2.

c. On receipt of time expiry events, the time of the event is held as t2. The mouse velocity is calculated as (p2−p1)/(t2−t1). The value of p2 is then stored in p1, and the value of t2 stored in t1. The appropriate display scale for the image is then calculated, inversely proportional to the mouse velocity, and applied, centred about p2. The exact relationship between the mouse velocity and the display scale, is preferably determined by user tests, and may be controlled by run time configuration to suit different purposes.

d. On receipt of a mouse button release for the same designated mouse button, the transformation flag is reset, the asynchronous timer is stopped, and the display scale and position restored to d0.

Thus, in the case of translating a graphical entity from one screen location to another with a mouse pointer, the user first locates the mouse pointer over the entity and as soon as the user clicks and begins to drag the object to its new location the timer is started. Alternatively, the user selects the entity by, for example, moving the mouse pointer over the entity and right clicking. A pop-up menu is then displayed and as soon as the user selects the "move" option the timer is started.

As the object is being moved, the mouse pointer velocity is being periodically calculated at time intervals t2–t1. This interval should be long enough to allow the screen display to be re-drawn between zooms but short enough to make use of available processing power to zoom in smoothly from the original display scale to a larger temporary scale.

It will be seen that the relationship between pointer velocity and larger temporary display scale can be set according to any function, linear, exponential, ratchet (where the display scale only increases during image modification and does not decrease even if cursor velocity increases) or otherwise. The largest temporary scale can also be set in any number of ways. For example, the user may set a preference as to the largest temporary scale or it can be left to the controlling application to automatically determine the largest temporary scale. This could take into account many factors, for example, the intricacy of the drawing in the region of the graphical entity. Thus, the greater the intricacy of the drawing, the larger the largest temporary scale and perhaps the faster the application may zoom in. Intricacy can be calculated according to any number of criteria, for example, intricacy could be taken as proportional to the number of graphical entities appearing within the image display.

It will be seen that where a mouse or equivalent pointer is not used, a transformation mode may be initiated, and transformation steps applied using key strokes. It will be seen that such operations with a keyboard require the concept of selection in order to identify the graphical entity or entities to be operated on. In this second embodiment, once an entity is selected, the rate of transformation may be measured by counting transformation keystrokes over time enabling keystroke frequency to be calculated, and calculating the display scale accordingly. Determination of the completion of a graphical transformation can either be based on a defined period of keyboard inactivity or responsive to a user striking a pre-determined key, for example, "enter".

In a third embodiment, no timer is used and instead the drawing application is responsive to mouse and keyboard input. In this case, the following steps are used:

a. On receipt of a mouse button press event, a flag is set indicating a transformation mode, the current display scale and display position stored as d0, and the mouse position stored as p1.
 b. On receipt of mouse movement events whilst in the transformation mode, the mouse position is stored as p1.
 c. On receipt of a key press event for a first designated key, for example, "+", the display scale for the image is increased and applied, centred about p1. The incremental degree of increase in display scale is preferably determined by user tests, and may be controlled by run-time configuration to suit different purposes.
 d. On receipt of a key depression event for a second designated key, for example, "–", the display scale for the image is decreased and applied, centred about p1. Again, the incremental degree of decrease in display scale is determined by user tests, and may be controlled by run time configuration to suit different purposes.
 e. On receipt of a mouse button release for the same designated mouse button, the transformation flag is unset, and the display scale and position restored to d0.

In this embodiment, the user is essentially determining the display scale function as an entity is being transformed. This user is not limited to any largest temporary scale and can set the temporary scale as required.

It will be seen that in some keyboards "+" and "–" cannot be used without the "shift" key. In such cases, it may be preferable to use either the "up" and "down" arrow keys or the "ctrl" and "alt" keys to zoom in and out.

The techniques described above are equally applicable to additions to drawings, take for example line or polyline drawing.

Figure 2:
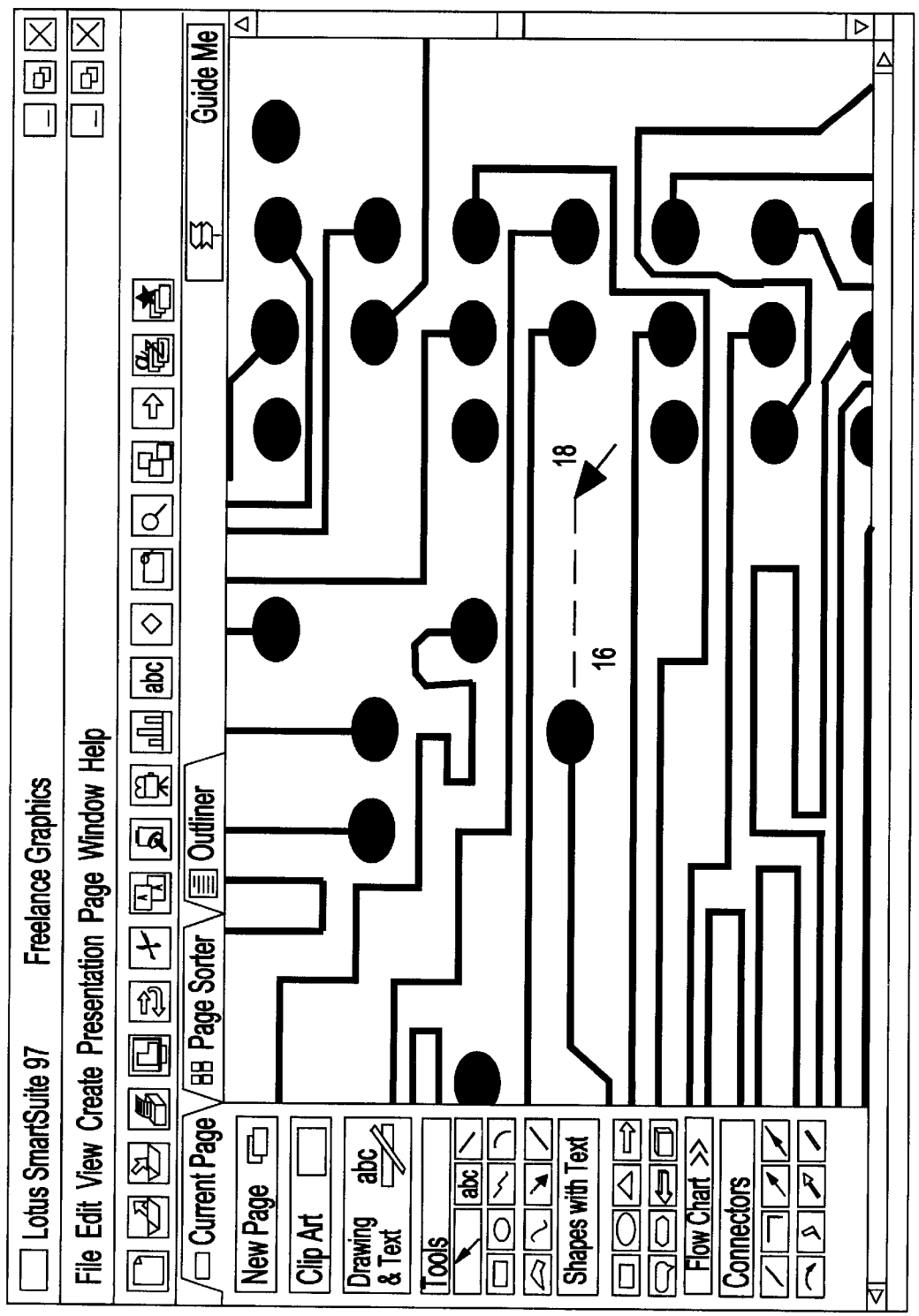
FIG. 2 shows a graphical application in which a user has begun to draw a line from a start position and the display scale has been adjusted according to the invention.

When a user decides to draw a new line, the image to be modified is displayed on a relatively small display scale so that the overall context of the image can be understood, FIG. 1. The mouse pointer is preferably moved to a menu (10) and an icon (12) indicating line drawing is selected. Alternatively, the user goes to the pull-down menus (14) at the top of the screen and selects the line draw option from a text based menu using the mouse pointer. This can also be achieved using keyboard short-cut keys, for example "Alt-L", if available. In any case, once line draw 18 selected the user begins to move the cursor (18) towards a point (16) on the screen where the line is to begin. If the zoom function 18 automatic the timer starts and the display scale is adjusted as the cursor moves towards the point (16). If the zoom function is not automatic, the user presses designated keys "+" or "–" while moving the cursor (18) to change the display scale. As soon as the user places the cursor at the desired location and either clicks the mouse button or hits return or no movement is detected for longer than a predetermined time, the display scale returns to the original setting and the user proceeds to move the cursor to the next point on the line, FIG. 2, during which time the display scale is set in the same manner as when the cursor (18) approached the first point in the line.

It will be seen that the invention is not limited to general purpose programs such as desktop publication packages or presentation packages, but is applicable to any graphical application be it bespoke or otherwise where information to be modified can be beneficially displayed at more than one display scale. Neither is the invention limited to applications running in a Microsoft Windows environment, and can be run on any operating system, be it stand alone, network or distributed, enabling graphical display.

What is claimed is:

1. In a graphical application where an image is displayed according to a display scale, a method of adjusting the display scale during modification of said image by a user, comprising the following steps:
 a. responsive to user selection of a modification to be performed on said image, automatically storing a current display scale;
 b. automatically adjusting the displayed scale of said image in accordance with cursor movements during modification of said image; and
 c. responsive to user completion of said modification, automatically returning the displayed scale of said image to the stored display scale.

2. In a graphical application where an image is displayed according to a display scale, a method of adjusting the display scale during modification of said image, comprising the following steps:
 a. responsive to user selection of a modification to be performed on said image, storing the display scale;
 b. adjusting the display scale during modification of the image; and
 c. responsive to user completion of said modification, returning to the stored display scale, wherein said graphical application is responsive to pointing device movements and the step of adjusting the display scale includes:

b1. measuring the velocity of the pointing device during said graphical modification;

b2. adjusting the display scale as a function of the velocity of the pointing device during said graphical modification; and b3. re-centering the display of said image on the pointing device position.

3. A method according to claim 2 wherein said modification is one of a transformation of a graphical entity or an addition of a graphical entity.

4. A method according to claim 3 wherein said transformation is one of translation, rotation, scaling or inversion of a graphical entity.

5. A method according to claim 3 wherein said addition of a graphical entity is one of a line draw, a polyline draw, a shape draw, a text box insertion or a graphic insertion.

6. A method according to claim 2 in which said pointer device includes a button and said user selection comprises the user clicking on a menu option indicating the required modification.

7. A method according to claim 6 in which said user completion comprises the user clicking the mouse button.

8. A method according to claim 2 in which the step of adjusting the display scale includes:

b1.1. determining an intricacy value for the image surrounding the centre of said image display;

and wherein adjustment of the display scale is limited in inverse proportion to said image intricacy value.

9. A method according to claim 2 wherein the step of adjusting the display scale is carried out periodically.

10. A method according to claim 2 wherein said adjusting function is one of a linear, and exponential or a ratchet function.

11. A method according to claim 2 wherein said adjustment of said display scale is in inverse proportion to the velocity of the pointing device.

12. In a graphical application where an image is displayed according to a display scale, a method of adjusting the display scale during modification of said image, comprising the following steps:

a. responsive to user selection of a modification to be performed on said image, storing the display scale;

b. adjusting the display scale during modification of the image; and c. responsive to user completion of said modification, returning to the stored display scale, wherein said graphical application is responsive to keyboard keystrokes indicating cursor movement and the step of adjusting the display scale includes:

b1. measuring the frequency of cursor movement keystrokes during said graphical modification;

b2. adjusting the display scale as a function of the cursor movement keystroke frequency; and b3. re-centering the display of said image according to a direction indicated by said cursor movement keystrokes.

13. A method according to claim 12 wherein keyboard keystrokes are arrow keys.

14. A graphical application comprising means for displaying an image according to a display scale, including means for automatically adjusting the display scale during modification of said image by a user, said means comprising:

a. means, responsive to user selection of a modification to be performed on said image, for storing a current display scale;

b. means for automatically adjusting the displayed scale of said image in accordance with cursor movements during modification of said image by said user; and c. means, responsive to user completion of said modification, for automatically returning the displayed scale of said image to the stored display scale.

15. A computer program product comprising computer program code stored on a computer readable storage medium for, when executed on a computer, providing a graphical application where a display scale is adjusted during modification of an image, the program code comprising a graphical application as claimed in claim 14.

* * * * *